Sept. 3, 1935.   J. W. SNARRY   2,013,365
MEANS FOR USE IN EXAMINING THE CONTOURS OF GEAR WHEEL TEETH
Filed Nov. 3, 1932   4 Sheets-Sheet 4

J. W. Snarry
INVENTOR

By: Glascock Downing & Seebold
ATTYS.

Patented Sept. 3, 1935

2,013,365

UNITED STATES PATENT OFFICE 2,013,365

MEANS FOR USE IN EXAMINING THE CONTOURS OF GEAR WHEEL TEETH

John Wildsmith Snarry, Handsworth, Birmingham, England, assignor to The Gear Grinding Company Limited, Birmingham, England Application November 3, 1932, Serial No. 641,095
In Great Britain November 30, 1931

2 Claims. (Cl. 33—174)

This invention has for its object to provide improved means for use in examining the contours of gear wheel teeth, and particularly for determining the presence of errors in such teeth.

The invention comprises the combination of a fixed body having a circular portion, means for securing the workpiece coaxially with the said body, a member rotatable about the axis of the fixed body, a feeler slidably mounted on the rotatable member and adapted to move in contact with the gear tooth to be examined, a tensioned flexible member embracing a part of the circular portion of the fixed body, and means for interconnecting the rotatable member, the feeler and the flexible member, the arrangement being such that inaccuracy of tooth form will cause the feeler to move relatively to the rotatable member, and such movement is indicated by a suitable measuring or indicating instrument.

Figure 1:
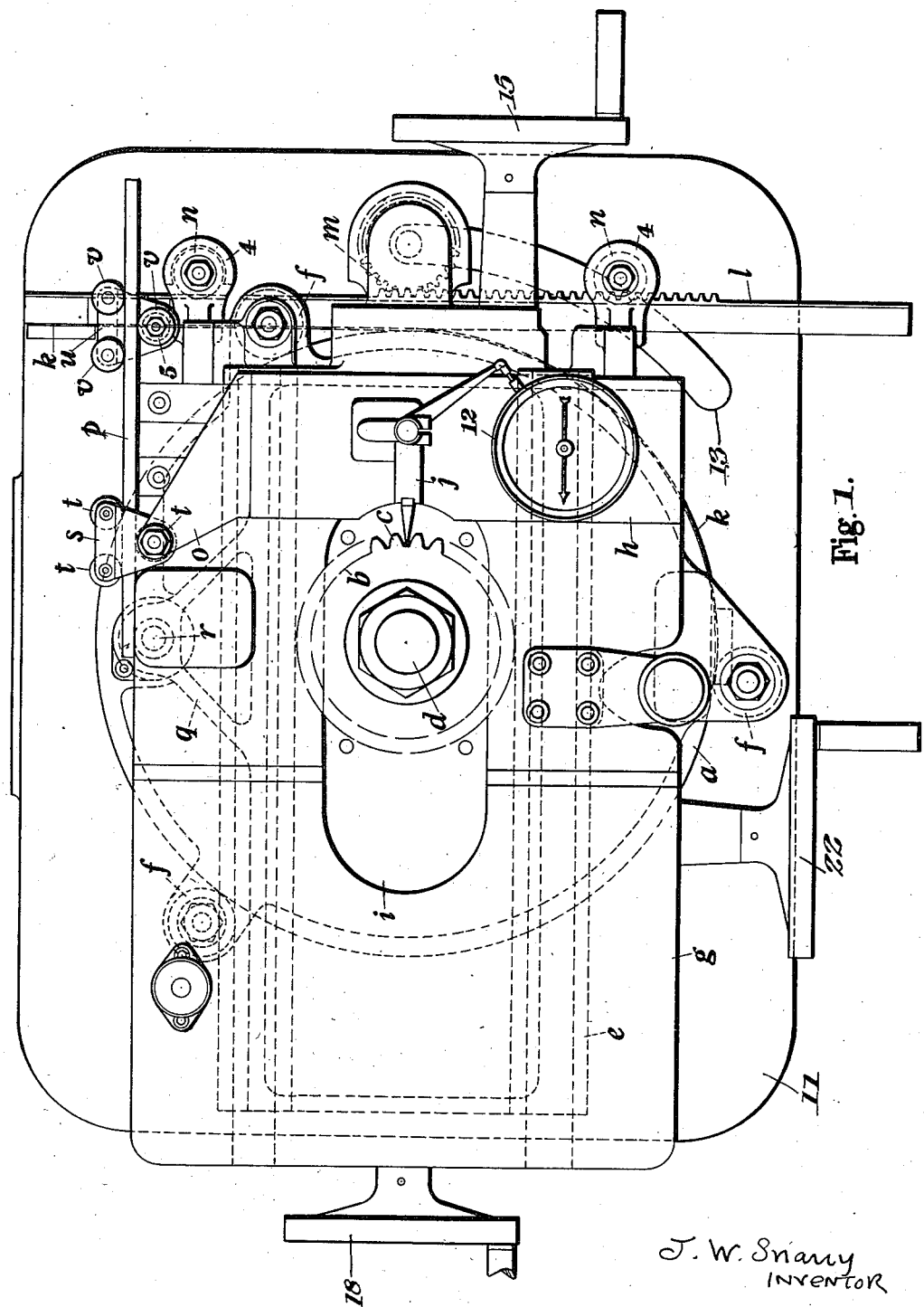
Figure 2:
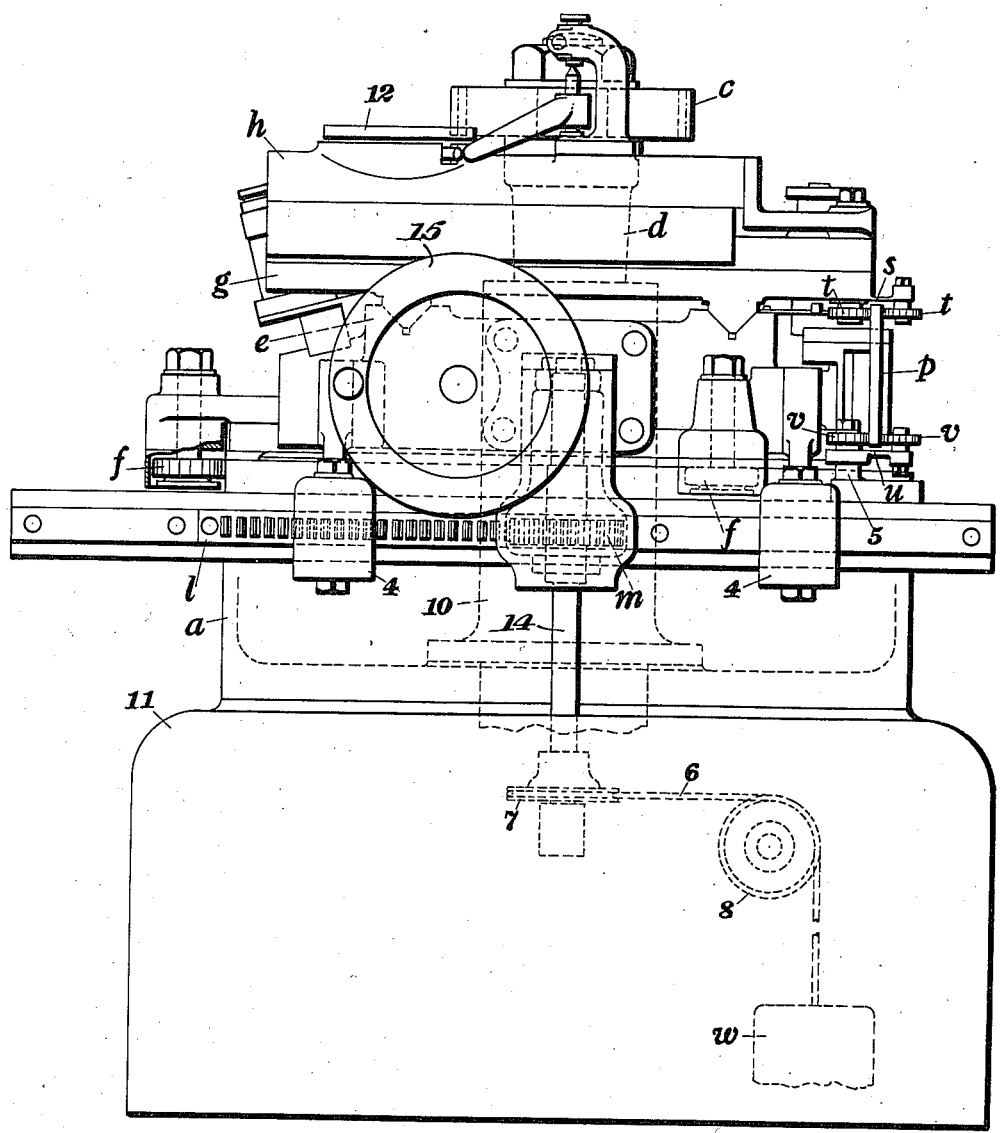
Figure 3:
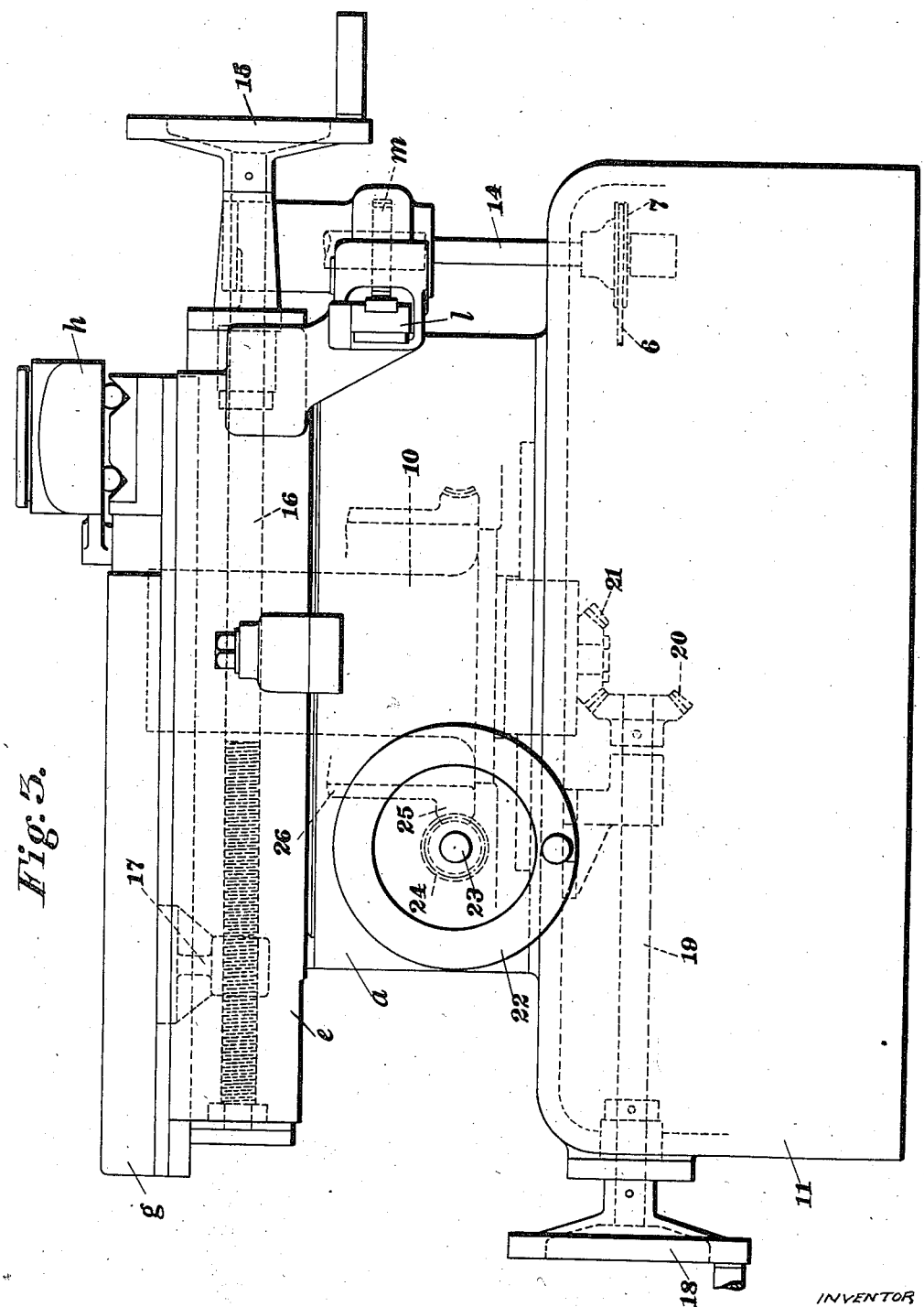
Figure 4:
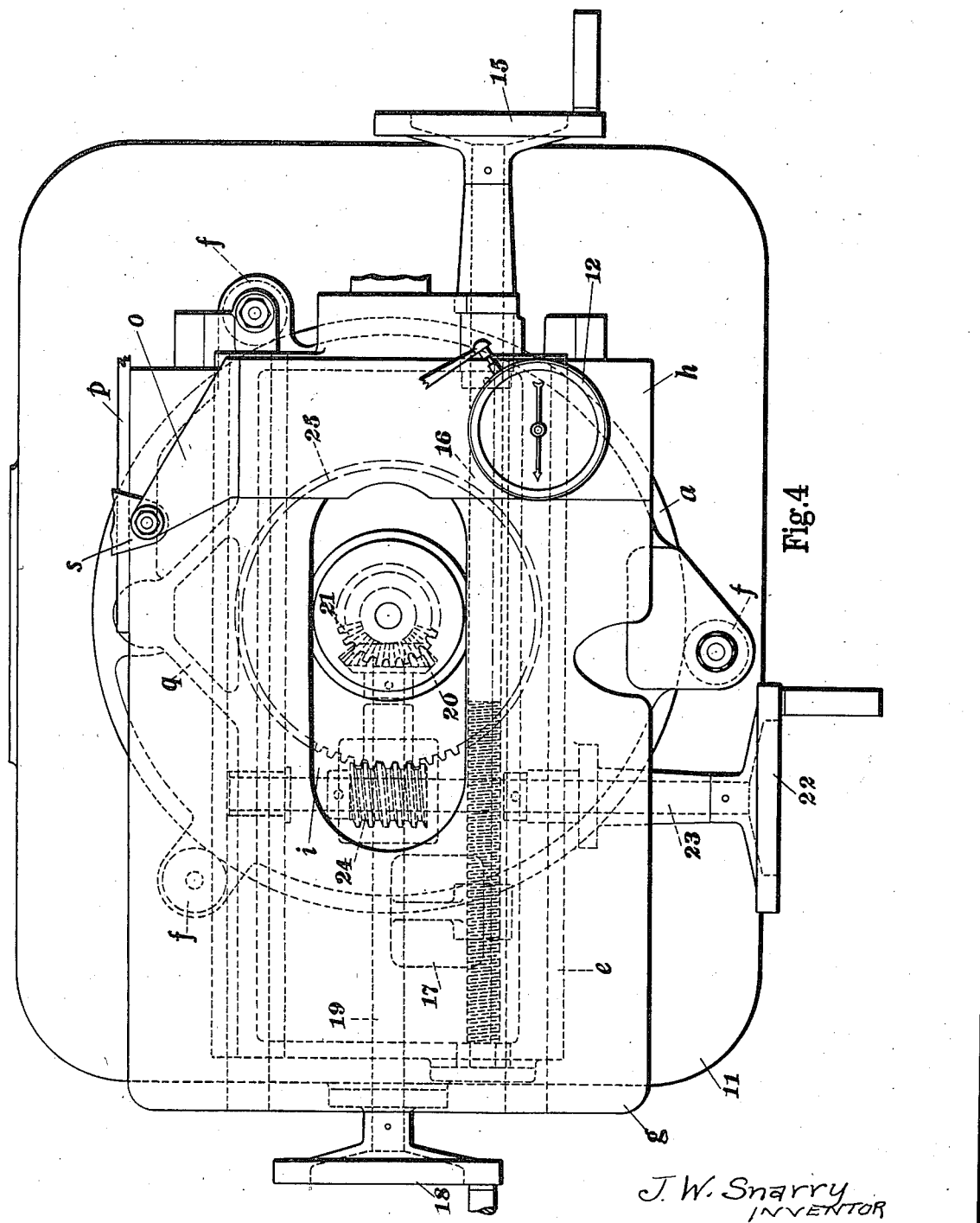

In the four accompanying sheets of explanatory drawings,

Figures 1 and 2 are respectively a plan and an end view of a contour testing machine embodying the invention, whilst Figures 3 and 4 are respectively an elevation and another plan view of the machine showing operating mechanism not shown in Figures 1 and 2, but omitting some of the parts shown in these latter figures.

Referring to the drawings, I employ a body $a$ having a circular portion of any suitable diameter which is larger than the diameter of the base circle $b$ or pitch circle of the toothed wheel $c$ to be examined. The body $a$ is fixed on a hollow base $11$, and a spindle $d$ on which the workpiece $c$ can be secured is arranged concentrically with the said body and is attached to a hollow vertical shaft $10$ mounted on the bottom of the part $a$.

Resting on the upper side of the fixed circular body $a$ is mounted a rotatable member $e$ which may conveniently be located by rollers $f$ running in contact with the periphery of the circular body, and on the upper side of this member $e$ is mounted a slide $g$. The slide $g$ carries another slide $h$ situated adjacent to the workpiece and capable of sliding at right-angles to the direction of motion of the slide $g$. The latter and the part $e$ are formed with a central gap as $i$ through which passes the spindle carrying the workpiece. The slide $h$ carries a feeler which is conveniently in the form of a light pivoted lever $j$ having one end adapted to bear against one side of the gear tooth to be tested. The other end of the lever actuates a dial type micrometer $12$ carried on $h$. The lever is kept in contact with the tooth face by the usual spring (not shown) of the micrometer. The other slide $g$ serves to move the slide $h$ and the feeler $j$ in a radial direction relatively to the axis of the workpiece and so enable workpieces of different sizes to be accommodated in the apparatus. The slide $g$ is adapted to be actuated by a hand wheel $15$ secured at the outer end of a shaft $16$ which is journalled in bearings formed on the rotatable member $e$, and which is in screw-threaded engagement with a boss on a bracket $17$ attached to the slide $g$.

Around a part of the circular portion of the body $a$ is wrapped a thin flexible metal or other strap $k$, one end of which is secured to the body $a$ and the other to any convenient tensioning device such as a floating rack bar $l$ which engages a pinion $m$ carried on $e$, the pinion being constantly subject to a torque exerted by a weight $w$ or spring (see Figure 2). By reason of this torque and of the co-operating teeth on the pinion $m$ and rack bar $l$, the latter is caused to maintain the strap $k$ under tension. The weight $w$ is contained in the hollow base $11$, and the torque is exerted on the pinion $m$ by the weight through the agency of a rope or the like $6$ passing around pulleys $7$, $8$. A slot $13$ is formed in the upper wall of the hollow base to accommodate a shaft $14$ which carries the pinion $m$ and the pulley $7$. The bar is carried on one end of the part $e$ by brackets $4$ and is held in position partly by contact at one side with the body $a$ through the strap $k$ and partly by contact at the other side with rollers $n$ on the brackets $4$. When the part $e$ is rotated relatively to $a$ it carries the bar $l$ with it and the latter can also move endwise, but it always occupies a position tangential to the body $a$. Also the part $e$, an extension $o$ of the slide $h$ carrying the feeler, and the rack bar $l$ (or the strap) are all connected together by a link $p$.

It will be seen that the link $p$, which is in the form of a flat bar, is attached at one end to a lug $q$ at one side of the part $e$ by a pivot $r$. The extension $o$ is connected to the link by a slider $s$ which is provided with rollers $t$ bearing on opposite sides of the link and pivotally attached to $o$. The rack bar $l$ is attached to the link $p$ by another slider $u$ which is provided with rollers $v$ which bear on opposite sides of the link and is pivoted at $5$ on the rack bar. It will be noticed that the rollers $t$ of the slider $s$ engage the upper edge of the link $p$, whilst the rollers $v$ of the slider $u$ engage the lower edge.

When the workpiece c has been mounted on the spindle d the slide g carrying the slide h is moved by means of the hand wheel 15 so as to bring the slider s to a suitable position on the link p. The distances of the sliders u and s from the pivot r are then in the ratio of the diameter of the body a to the diameter of the base or pitch circle of the workpiece, whilst the pivot axis of the slider s and the contact end of the feeler j lie in a line which is tangential to the said base or pitch circle. Also the feeler j is brought into contact with one side of the tooth to be tested as shown in the drawings. This is effected by turning the workpiece c, through the agency of a hand wheel 18, about its axis until the tooth side to be tested contacts with the feeler j. The hand wheel 18 is secured to the outer end of a shaft 19 journalled in the base 11 and carrying at its other end a bevel wheel 20 which, by engaging another bevel wheel 21 secured to the hollow shaft 10 permits the motion of the hand wheel 18 to be transmitted to the workpiece. The rotatable member e, the feeler j, the link p, the rack bar l and the tensioned strap k can then all be rotated as a unit about the body a through the desired angular distance, the sliders s and u moving along the link p. Also the slide h moves to a small extent on the slide g under the control of the link p. Rotation can be imparted to the member e by a hand wheel 22 secured at the outer end of a shaft 23 which is journalled in the fixed body a and which carries a worm 24. The worm engages a toothed gear 25 terminating the lower end of a flange 26 depending from the rotatable member e. It will be evident from the drawings that when the member e is rotated in a clockwise direction from the position shown, the free end of the strap k describes the involute of the circular portion of the fixed body a, that is to say, the involute of a circle having a diameter larger than that of the base or pitch circle of the toothed wheel to be examined. The link p and the slide h together form what may be termed a reduction link-motion whereby the involute aforesaid is used for examining the contour of the toothed wheel. As the free end of the rack bar l is attached to and follows the movement of the free end of the strap, it also describes the same involute, and this movement is communicated through the slider u to the free end of the link p, with the result that similar movement on a smaller scale is imparted to the slider s. As, moreover, the distances of the sliders u and s from the pivot r are in the ratio of the diameter of the fixed body a to the diameter of the base or pitch circle of the toothed wheel being examined, it follows that the feeler j together with the slide h is caused to describe an involute which is that of the base or pitch circle of the toothed wheel being examined. During this movement the feeler will traverse the face of the tooth to be examined. If the tooth is of accurate form, there will be no relative movement between the feeler and the slide h which carries it, but if an inaccuracy is present a relative movement will occur and this will be indicated by the micrometer.

The principle underlying the apparatus is already known, and has previously been used by me in the testing of gear wheel teeth. The apparatus differs, however, in that the body a and workpiece c are fixed, and the feeler is caused to move through the required curved path determined by the unwrapping or wrapping of the strap k from or on to the circular portion of the body. By my invention I am able to obtain practical advantages which experience has proved to be desirable. Thus I am able to provide a robust apparatus which whilst possessing all the required accuracy is well suited to work-shop requirements. Also, the one fixed body serves for a wide range of workpieces of different diameters.

Having thus described my invention what I claim as new and desire to secure by Letters Patent is:—

1. In means for use in examining the contours of gear wheel teeth, the combination of a fixed body having a circular portion, means for securing the workpiece co-axially with the said body, a member rotatable about the axis of the fixed body, a slide carried on the rotatable member and movable relatively to it in a radial direction, a second slide carried on the first slide and movable at right-angles to the direction of motion of the first slide, a feeler and indicator carried on the second slide, a rack bar carried by the rotatable member, a pinion carried by the said member and engaged by the rack bar, a weight, the pinion being constantly acted on by a torque exerted by the weight, a flexible strap arranged around the circular portion of the fixed body and attached at its ends to the said body and the rack bar respectively, a link pivoted at one side of the rotatable member, and means for effecting slidable connection between the link and the rack bar and the slide carrying the feeler and indicator, substantially as described.

2. In means for use in examining the contours of gear wheel teeth, the combination of a fixed body having a circular portion with a diameter larger than those of the workpieces to be examined, means for securing the workpiece co-axially with the said body, a member rotatable about the axis of the fixed body, a feeler adapted to move in contact with the gear tooth to be examined, means slidably mounted on the rotatable member for supporting the feeler, a tensioned flexible member embracing a part of the circular portion of the fixed body, means for interconnecting the rotatable member, the feeler supporting means and the flexible member, the arrangement being such that inaccuracy of tooth form will cause the feeler to move relatively to its supporting means upon rotation of the rotatable member, and means for indicating such movement of the feeler, substantially as described.

JOHN WILDSMITH SNARRY.